United States Patent [19]

Danison

[11] Patent Number: 4,601,128
[45] Date of Patent: Jul. 22, 1986

[54] SNARE TRAP WITH TUBULAR BODY

[76] Inventor: Carl L. Danison, 2079 Jewel La., Loxahatchee, Fla. 33470

[21] Appl. No.: 690,036

[22] Filed: Jan. 9, 1985

[51] Int. Cl.⁴ ............................................ A01M 23/34
[52] U.S. Cl. ........................................ 43/82; 43/87
[58] Field of Search ...................................... 43/87, 82

[56] References Cited

U.S. PATENT DOCUMENTS

| | | | |
|---|---|---|---|
| 1,031,728 | 7/1912 | Obiols | 43/87 |
| 1,738,907 | 12/1929 | Kleffman . | |
| 1,860,378 | 5/1932 | Bailey . | |
| 2,146,019 | 2/1939 | Knippelmeir . | |
| 2,894,352 | 7/1959 | McDonald | 43/87 |
| 3,958,360 | 5/1976 | King . | |
| 3,967,408 | 7/1976 | Aberg . | |
| 4,083,142 | 4/1978 | Gregerson . | |
| 4,158,929 | 6/1979 | Custard | 43/82 |
| 4,171,589 | 11/1979 | Brownlie . | |
| 4,286,404 | 9/1981 | Novak et al. . | |
| 4,329,805 | 5/1982 | Novak . | |
| 4,389,807 | 6/1983 | Novak . | |

Primary Examiner—Nicholas P. Godici
Assistant Examiner—C. McKee
Attorney, Agent, or Firm—Steele, Gould & Fried

[57] ABSTRACT

An animal trap having a hollow elongated body; a snare having a cable with a mechanism at one end for slidably engaging one end of the cable to the cable so as to form a loop of variable diameter, the loop encircling an interior cross section of the body; a spring biased spring arm pivotally mounted to the body, the free end of the spring being engageable with the free end of the cable; and, a trigger mounted interiorly of the body and extending through the body and engageable with the spring arm, the trigger holding the spring arm in tension with the spring biasing, and releasing the spring arm when pulled by an animal appendage inserted into the hollow body, so as to tighten the snare around the appendage.

15 Claims, 6 Drawing Figures

SNARE TRAP WITH TUBULAR BODY

BACKGROUND OF THE INVENTION

1. Field of the Invention

This invention relates generally to animal traps, and more specifically to a mount for a snare-type animal trap.

2. Description of the Prior Art

Traps often harm the animal which they capture. Snare traps are desirable because they effectively leash the animal without causing serious injury. Snare traps typically consist of a piece of wire or cable, one end of which is slidably fastened to itself so as to form a loop of variable circumference. The free end of the wire or cable is attached to a spring-biased movable member. The movable member is held in a cocked position against the spring biasing by a trigger mechanism. Typically, the trigger mechanism includes a tread release that is placed inside the snare loop such that when an animal steps inside the snare and onto the tread release, the movable member is released. The spring biasing moves the member such that the attached free end of the snare loop is drawn away from the loop, tightening it around the animals leg. The snare is formed with a snare clip which will allow the loop to tighten but not to loosen. The animal is held securely, but stiffly, with little freedom of movement.

Tread released snare traps are undesirable because they are activated by an animal which happens to step on the release. Further, they pose a health hazard in more populated areas where there exists a dnager that children will accidentally step on the release. A further difficulty with previous traps is the relative difficulty in setting them. The traps for larger animals are often bulky and difficult to transport to remote areas. The trigger mechanisms can be troublesome, if not dangerous, to set.

SUMMARY OF THE INVENTION

It is an object of this invention to provide an animal trap which will not seriously harm the animal which is captured.

It is another object of the invention to provide an animal trap of the snare type which cannot be accidentally triggered by an inadvertent step on the release.

It is a further object of the invention to provide a trap which will allow the captured animal a range of movement.

It is still another object of the invention to provide an animal trap which is lightweight and compact, yet durable.

It is another object of the invention to provide an animal trap which can efficiently trap animals of a variety of sizes.

These and other objects are accomplished by the provision of an animal trap with a hollow elongated body with a trigger mechanism mounted therein. The trigger mechanism extends through the body to engage a movable member pivotally mounted to the exterior of the body. The member is spring biased, such that when released by the trigger, the movable member rapidly swings on its pivot. The free end of the movable member engages the free end of a snare. The snare loop encircles an interior cross section of the body in front of the trigger mechanism.

The trap is mounted to a tree or similar structure. Bait is placed behind the trigger mechanism. The movable member is drawn against the spring biasing to engage the trigger. The free end of the snare is engaged to the free end of the movable member. The snare loop is positioned around the opening of the elongated body. An animal attracted by the bait will place its foot or paw into the elongated body, through the snare loop, and pull at the trigger. This will release the movable member whereupon the spring biasing will cause it to pivot and to take the free end of the snare with it. In this manner, the snare will be drawn tightly around the animal's foot or paw. The free end of the snare preferably becomes disengaged from the movable member, but not the body, such that the animal is permitted a range of movement.

BRIEF DESCRIPTION OF THE DRAWINGS

There are shown in the drawings forms which are presently preferred. It should be understood, however, that the invention is not limited to the precise arrangements and instrumentalities shown.

DETAILED DESCRIPTION OF THE PREFERRED EMBODIMENTS

Figure 1:
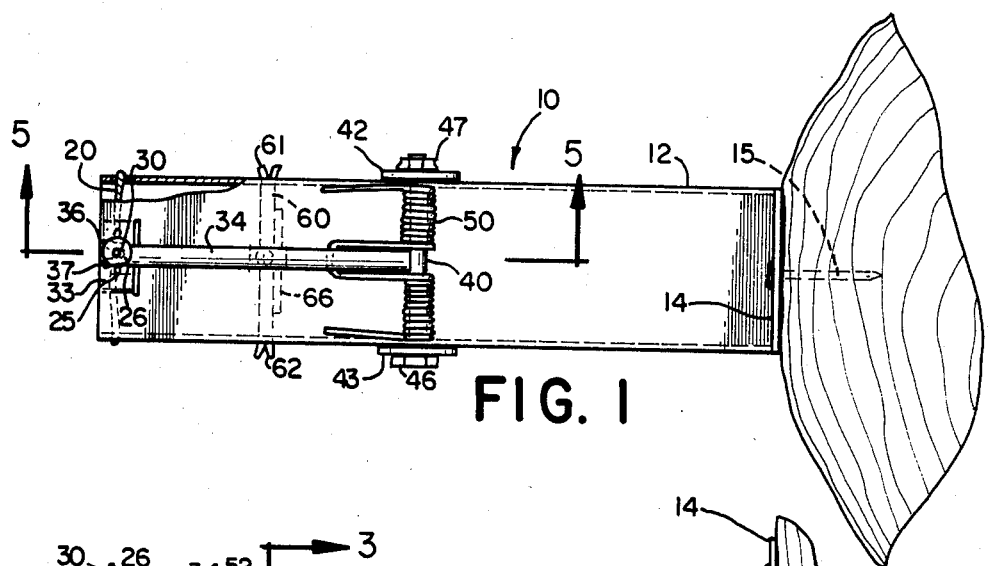
FIG. 1 is a plan view of a trap according to this invention.
Figure 2:
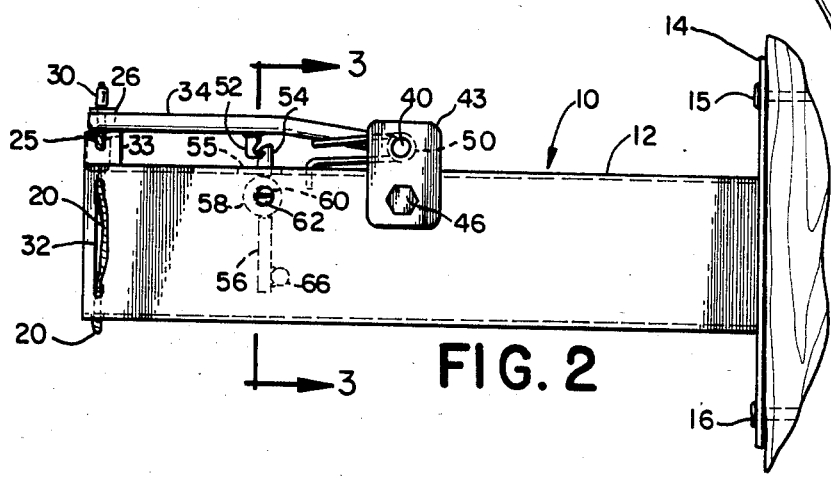
FIG. 2 is a side elevational view of FIG. 1.
Figure 4:
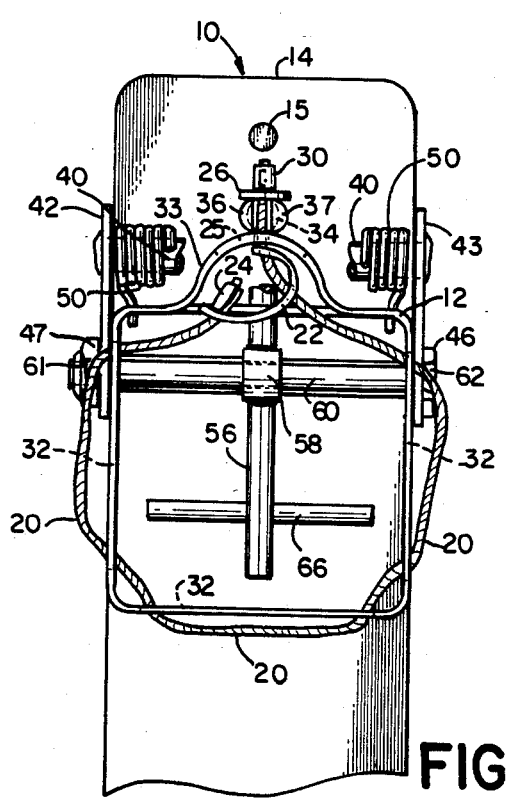
FIG. 4 is a left side elevational view of FIG. 2.
Figure 3:
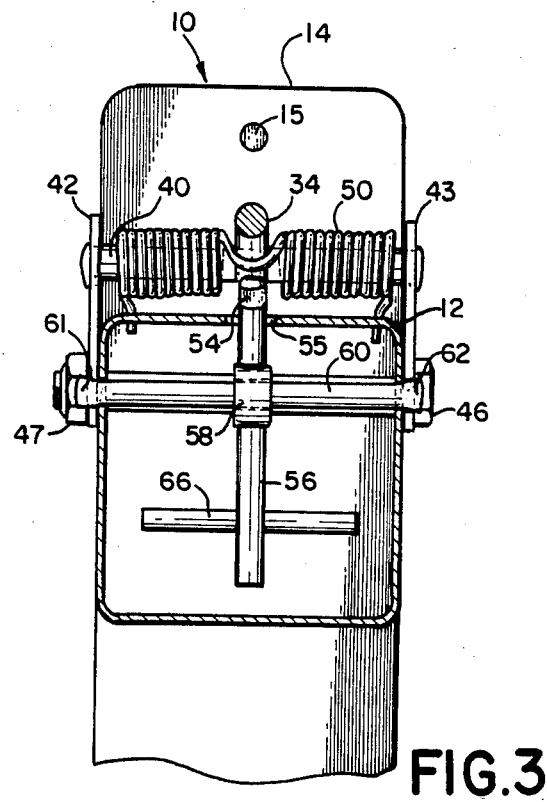
FIG. 3 is a cross-section taken along the line 3—3 in FIG. 2.

Referring now to the drawings, where like numbers relate to like elements in the various figures, a trap according to the present invention is shown generally at 10. The trap has a hollow elongated body 12, of substantially square cross-section. The body can have a mounting flange or plate 14 at one end thereof to receive suitable mounting means such as nails 15, 16 which secure the trap to a support such as a tree, and leaving the other end of the body open. The body and mounting flange may be welded or bolted together, or otherwise suitably joined. The trap has a snare 20 of variable diameter disposed near the open end of body 12. The snare comprises a wire or cable and has threaded thereon a snare clip 22 which also engages a stop 24 at one end of the snare to define a loop and a free end of cable extending from the loop. The snare clip 22 is of the type known in the art which will slide along the cable to tighten the loop around an object when the free end is pulled. The clip is self-locking, and once the loop is tightened, will not readily work free. Slots 32 may be provided in the body 12 through which portions of the loop may be pulled (FIG. 4) to set the trap. Such an arrangement minimizes obstruction of the opening and prevents a paw or foot from entangling the snare. Similarly, the body 12 may have an outwardly-projecting portion 33 formed at its opening to receive the clip 22 such that the opening remains clear. The free end of the snare extends through an opening 25 in the outwardly projecting portion 33. The free end is fitted at its extreme end with stop 30 and washer 26. The washer 26 and stop 30 rest on the spring arm 34. The wire or cable immediately below the stop 30 and washer 26 fits into the channel of a yoke formed by the arms 36, 37 of the spring arm 34. The spring arm 34 includes a T section 40 pivotally mounted in suitable fittings in flanges 42, 43. The flanges 42-43 are secured to the exterior of the body 12 by bolt 46 and nut 47. Biasing means such as the spring 50 act to pivot the spring arm around an axis through the T section 40. The winding of the spring 50 also prevents the T section 40 from moving longitudinally so as to become detached from one of its fittings in the flanges 42-43. The spring 50 acts to rotate the spring arm 34 away from the open end of the body 12.

The spring arm 34 is held in a "cocked" position by latch means such as a hook 52. The hook 52 engages a similar but oppositely directed hook 54 on the trigger mechanism 56. When "cocked", the spring arm 34 is substantially parallel to the body 12 with the yoke arms 36, 37 adjacent the opening 25 and engaging the washer 26 and stop 30. The hooks 52 and 54 open opposite one another, along substantially along the direction of the longitudinal axis of the body 12. The trigger 56 is a downwardly-directed rod or bar extending through an opening 55 in the body 12. It is rotatably mounted on cross bar 60 by means of an annular portion 58 through which the cross bar 60 passes. The cross bar 60 is mounted by suitable means such as split ends 61, 62. The trigger 56 may further include members such as the horizontal bar 66 to catch the animal's paw as it tries to pull the bait out.

The trap is mounted on a suitable support such the base of a tree by nails 15, 16. A proper bait for the desired animal is placed behind the trigger 56. The snare loop is formed with portions of the loop extending through slots 32 and with the clip 22 resting in the outwardly-projecting portion 33 so as to not obstruct the opening of the body 12. The spring arm 34 is pivoted against the spring 50 to a position substantially parallel to the body 12 with the yoke arms 36, 37 adjacent the opening. Hook 54 on the trigger 56 engages the hook 52 on the spring arm 34. The free end of the snare 20 is placed in the channel formed by yoke arms 36, 37, with washer 26 resting on top of the channel and stop 30 extending above the channel.

Figure 5:
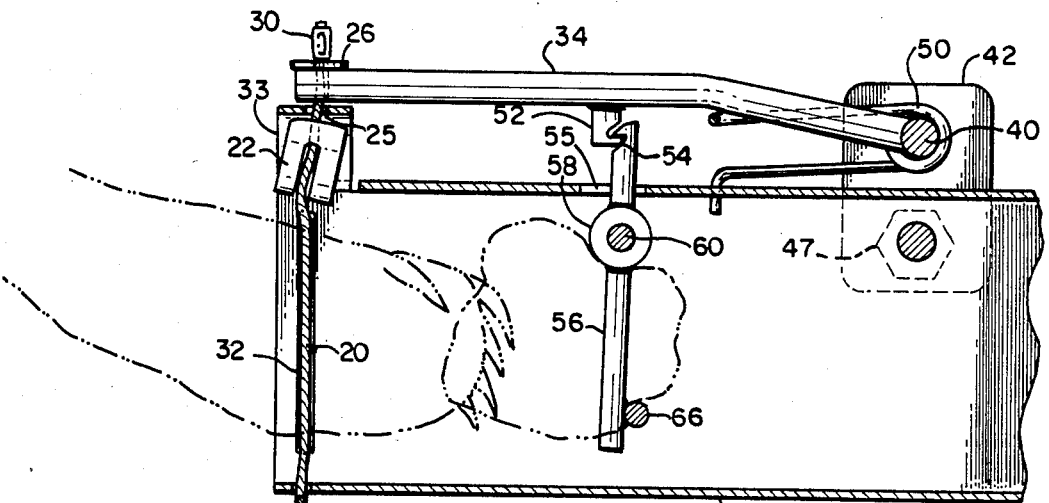
FIG. 5 is a partial cross-section taken along line 5—5 in FIG. 2 showing an animal foot or paw inside the trap.

When an animal is attracted by the scent of the bait, it sticks its paw through the opening, and thus the snare loop, and tries to pull the bait out from behind the trigger (FIG. 5). In doing so, the paw catches the trigger 56 or cross member 66, which in turn causes the trigger 56 to pivot on the cross bar 60. The hook 54 rotates backwards and disengages the hook 52 on the spring arm 34.

Figure 6:
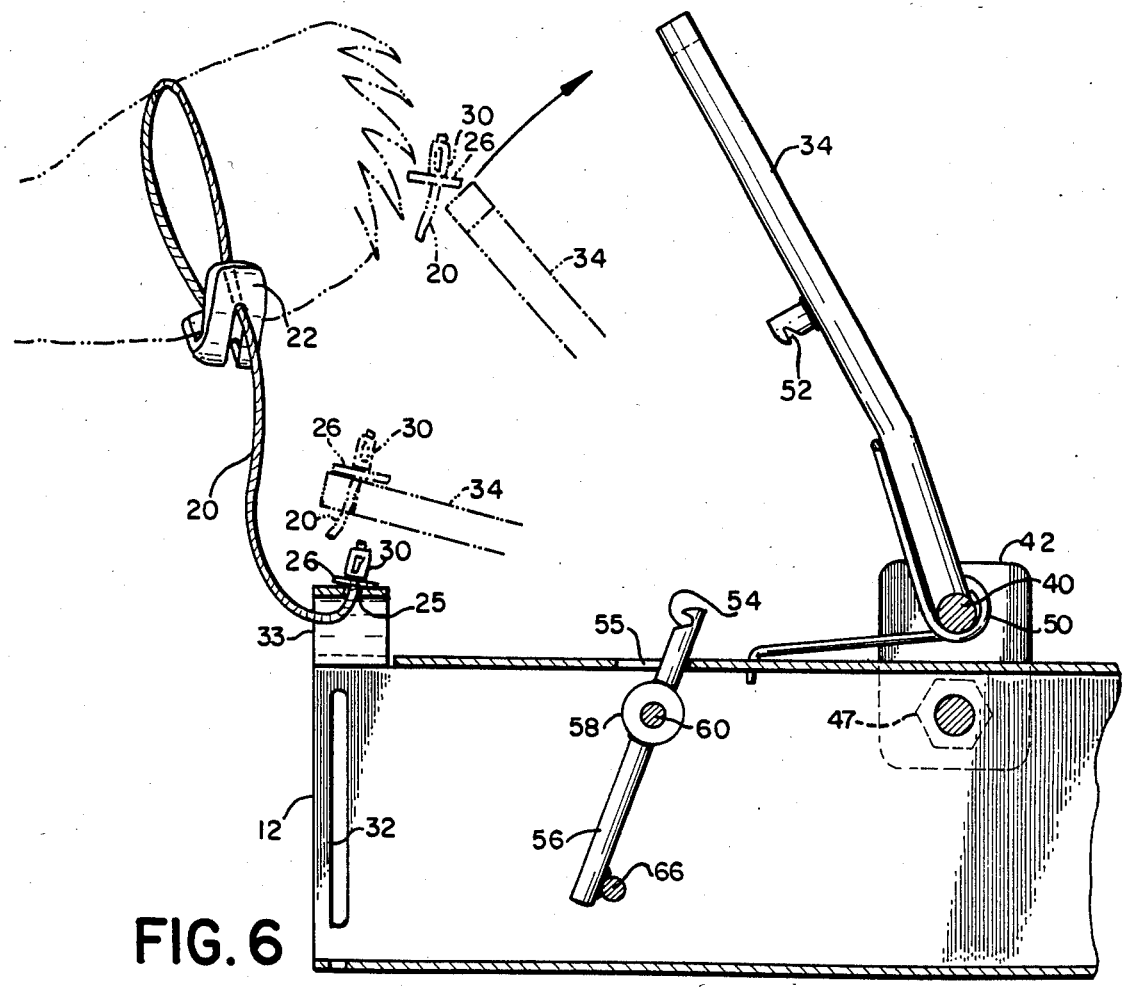
FIG. 6 is a partial cross-section showing a snared foot or paw, and successive stages of operation in phantom.

The spring arm 34 is now free to pivot on its T section 40 towards the back of the body 12 under the influence of spring 50. The free end of the snare 20, engaged by washer 26 and stop 30 to the spring arm 34, is carried with the spring arm 34, thereby drawing the free end of the cable through the snare clip 22 so as to tighten the snare loop around the animal's paw (FIG. 6). The snare clip 22 keeps the snare loop tightly locked around the animal's paw. The spring arm 34 eventually is stopped in its backward pivot when the snare has tightened as much as possible and all slack has been taken up from the free end. At this point, the spring arm will be approximately 45° above the front of the body 12. The animal's struggle to free itself will eventually jerk the cable out of the channel between the yoke arms 36-37 (shown in phantom in FIG. 6), if the cable has not already slipped out during movement of the spring arm. The spring arm 34 will then continue to pivot to its final resting position substantially parallel to the body 12 with its free end adjacent the flange 14. The animal will then be able to pull the free end of the cable back through the opening 25 until the washer 26 and stop 30 engage outwardly-projecting portion 33 and prevent the extreme end of the cable from passing through the opening. This allows the animal a range of movement defined approximately by the length of cable remaining between the loop and the stop 30. In this manner the animal is safely but securely captured and is given a range of movement which at least will allow the animal to pivot its body.

The trap is preferably made of a quality metal, for example steel, aluminum or an appropriate alloy, although other materials known in the art would do. The snare is typically made from wire or cable, although a high-strength synthetic material such as nylon might suffice for smaller animals.

This invention may be embodied in other specific forms without departing from the spirt or essential attributes thereof, and accordingly, reference should be made to the appended claims, rather than to the foregoing specification, as indicating the scope of the invention.

I claim:

1. An animal trap comprising:

a hollow elongated body;

a snare comprising a cable having at one end thereof means for slidably engaging one end of said cable to said cable so as to form a loop of variable diameter, said loop encircling an interior cross section of said body;

a spring biased spring arm pivotally mounted to said body, the free end of said spring arm being engageable with the free end of said cable; and, trigger means mounted interiorly of said body and extending through said body and engageable with said spring arm, said trigger means holding said spring arm in tension with said biasing, and releasing said spring arm when pulled by an animal appendage inserted into said hollow body, so as to tighten said snare around said appendage;

the trigger means comprising a hook portion opening towards said loop and extending through an opening in said body, said hook portion engaging a hook on said spring arm opening in the opposite direction so as to hold said spring arm in tension with said spring biasing, said trigger means being pivotally mounted; and, an actuating portion extending below said pivotal mounting, said pivotal mounting having an axis located and directed such that when said actuating portion is pulled toward said loop said hook portion is pivoted away from said hook on said spring arm so as to disengage said hooks and release said spring arm;

the free end of said cable having a washer thereon and a stop to prevent said washer from sliding off said end, and said free end of said spring arm having a yoke to receive said free end of said cable, said washer preventing said cable from slipping through said yoke, whereby when said spring arm is released by said trigger means and said trigger arm is moved by said spring biasing, said free end of said cable is also moved to tighten said snare and subsequently fall free of said spring arm.

2. The trap of claim 1, wherein said free end of said cable extends through a hole in said body.

3. The trap of claim 2, wherein said means for slidably engaging said end of said cable to said cable comprises a substantially U-shaped snare clip.

4. The trap of claim 1, wherein said body further comprises slots located adjacent the open end of said body so as to receive portions of said loop.

5. The trap of claim 1, wherein said spring arm pivots in a vertical plane extending through the longitudinal axis of said body.

6. The trap of clam 1, wherein said actuating portion is an inverted T-shaped member extending from said pivot means.

7. An animal trap comprising:
a hollow elongated body;
a snare comprising a cable having at a first end thereof means for slidably engaging the first end of said cable to said cable so as to form a loop of variable diameter, said loop encircling an interior cross section of said body;
a spring biased spring arm pivotally mounted to said body, the free end of said spring arm and the second end of said cable having means for releasably engaging the free end of said spring arm to the second end of said cable;
trigger means mounted interiorly of said body and extending through said body and engageable with said spring arm, said trigger means holding said spring arm in tension with said biasing and releasing said spring arm when moved by an animal appendage inserted into said hollow body;
said second end of said cable being slidably engaged to said hollow body by cable engagement structure and having stop means thereon to prevent said second end of said cable from becoming disengaged from said cable engagement structure, whereby when said trigger means is moved by an animal appendage and said spring arm is released by said trigger means and said spring arm is moved by said spring biasing, said second end of said cable is also moved so as to tighten said snare around said appendage; and whereby when said snare has tightened around said animal appendage said second free end of cable releases from said releasable engagement means and said cable may be moved relative to said hollow body by said animal until said stop means engages said cable engagement structure to permit said animal a range of free movement.

8. The trap of claim 7, wherein said stop means at the second end of said cable comprises enlargement means, and said free end of said swing arm comprises restriction means engaging said enlargement of said second end of said cable in the pivot direction, and enabling disengagement of said cable in another direction.

9. The animal trap of claim 7, wherein said trigger means comprises hook means extending through an aperture in said body, said hook means engaging corresponding hook means on said spring arm so as to hold said spring arm in tension with said spring biasing, said trigger means being pivotally mounted; and, an actuating portion extending below said pivotal mounting, said pivotal mounting having an axis located and directed such that when said actuating portion is moved said hook means on said trigger means is moved away from said hook means on said spring arm so as to disengage said respective means and hook and release said spring arm.

10. The trap of claim 8 wherein said restriction means of said free end of said spring arm has a Y-shape.

11. The trap of claim 10, wherein said cable engagement structure comprises a hole in said body, said hole being dimensioned to prevent passage of said stop means therethrough.

12. The trap of claim 11, wherein said means for slidably engaging said first end of said cable to said cable comprises a substantially U-shaped snare clip.

13. The trap of claim 1, wherein said body further comprises slots located adjacent the open end of said body so as to receive portions of said loop.

14. The trap of claim 1, wherein said spring arm pivots in a vertical plane extending through the longitudinal axis of said body.

15. The trap of claim 1, wherein said actuating portion is an inverted T-shaped member extending from said pivot means.

* * * * *